United States Patent [19]
Fontaine

[11] 3,831,698
[45] Aug. 27, 1974

[54] MOTOR VEHICLE BRAKE SYSTEM
[75] Inventor: John G. Fontaine, Fort Lauderdale, Fla.
[73] Assignee: Fail Safe Brake Corporation, Ft. Lauderdale, Fla.
[22] Filed: May 31, 1973
[21] Appl. No.: 365,433

Related U.S. Application Data
[62] Division of Ser. No. 135,193, April 19, 1971.

[52] U.S. Cl............................ 180/77 R, 180/82 B
[51] Int. Cl................................................. B60t 7/12
[58] Field of Search...... 180/77 R, 82 R, 103, 82 B; 192/3 TR; 200/61.89, 61.9, 61.91

[56] References Cited
UNITED STATES PATENTS

| | | | |
|---|---|---|---|
| 741,837 | 10/1903 | Sachs | 180/82 R |
| 2,079,978 | 5/1937 | Weiss | 192/3 TR |
| 2,323,208 | 6/1943 | Eaton | 180/82 R |
| 2,637,416 | 5/1953 | Guernsey | 180/105 R |
| 2,797,780 | 7/1957 | Wemp | 192/3 TR |
| 2,843,235 | 7/1958 | Weaver | 192/3 TR |
| 2,946,870 | 7/1960 | Brown | 200/61.89 |
| 3,426,872 | 2/1969 | Irie | 192/3 TR X |
| 3,593,815 | 7/1971 | Inoue | 192/3 TR X |
| 3,645,352 | 2/1972 | Stark | 180/82 R |

Primary Examiner—David Schonberg
Assistant Examiner—Terrance L. Siemens
Attorney, Agent, or Firm—Oltman and Flynn

[57] ABSTRACT

An Automatic Parking or Emergency brake system for motor vehicles comprising means by which the parking or emergency brakes of a motor vehicle will become applied automatically when the engine of the vehicle is shut off or stalls, and by which the brakes will become released automatically and immediately when the engine is started, and then only when the driver's seat is occupied and pressure exerted on the accelerator pedal. The described means includes also an arrangement by which, when the vehicle is halted at crossings and elsewhere on either level or hilly roadway, the parking or emergency brakes will be automatically applied within about three seconds after the vehicle comes to a complete stop and thus creeping of the vehicle is prevented, and this is particularly desirable when it is one of the automatic transmission type. The automatically-applied brakes may be released by depressing the accelerator pedal to operate a switch there.

2 Claims, 8 Drawing Figures

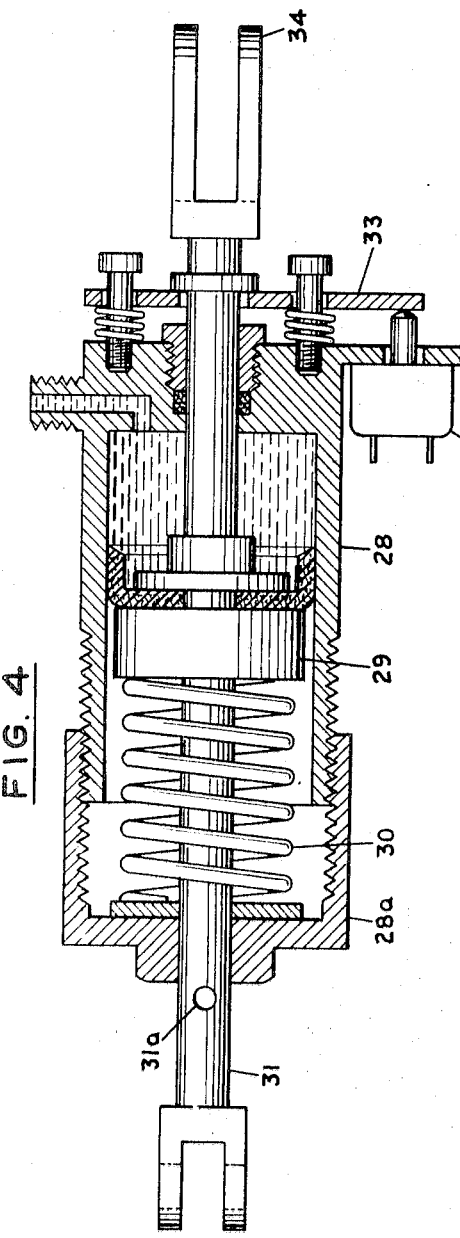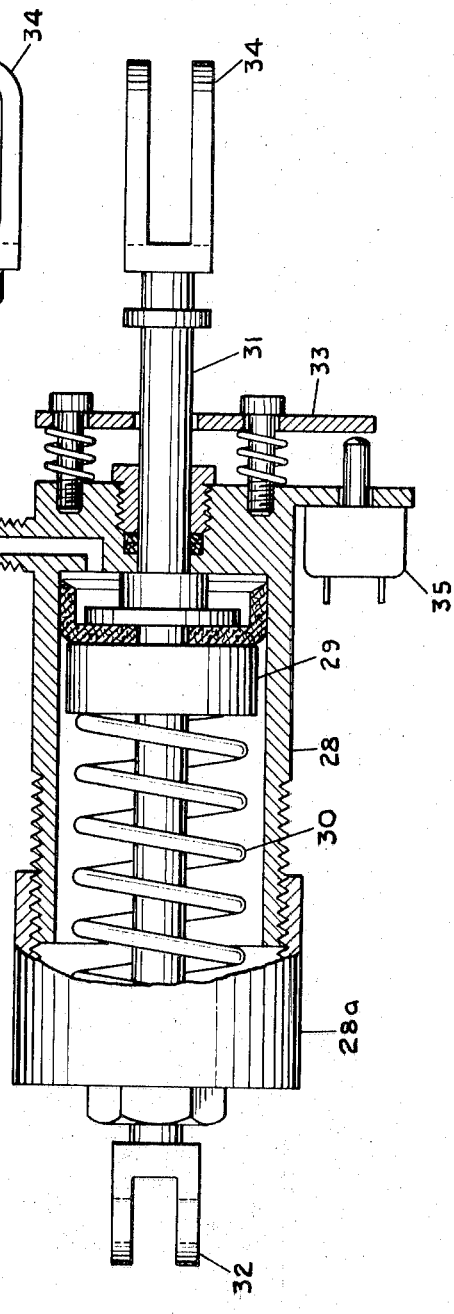

MOTOR VEHICLE BRAKE SYSTEM

This is a division, of application Ser. No. 135,193 filed Apr. 19, 1971.

Safety engineers, insurance adjusters and countless others are aware of numerous accidents that could have been avoided if all motor vehicles were equipped with effective brakes which when the vehicle was parked, would automatically apply and prevent what is commonly referred to as "roll-offs".

Since the development of automatic transmission some 25 years ago, the driver has been required to keep the service brake pedal depressed when stopped at crossings and elsewhere when the motor is running in order to prevent the vehicle from what is commonly referred to as "creeping". Many drivers may remember a time when they stepped on the brakes expecting the car to respond in the usual manner, only to discover that the foot pedal went to the floor; the car seemed to go faster rather than slowing down and an accident may have occurred before they had the time to apply the parking or emergency brake.

One of the objects of the present invention is to provide a parking or emergency brake that applies and releases automatically, one which is relatively simple to construct, is miniaturized for easy installation or connection to existing parking or emergency brake mechanisms now found on all motor vehicles.

Another object of the invention is to provide novel brake systems devised in a manner that will automatically prevent the vehicle from creeping forwardly or rolling backwards when stopped in drive or otherwise with the motor running, and which will automatically and instantly release before the vehicle moves with driver's seat occupied when pressure is applied to the accelerator without increasing the revolutions of the motor, thereby preventing excessive brake wear.

Still another object of the invention is to provide automatic parking or emergency brakes as a back-up system by placing one of the brake application switches beneath the service brake foot pedal so that in the event of service brake failure for any reason, parking or emergency brakes will immediately apply without the driver having to take further action, resulting in the vehicle being brought to a safe, controlled and gradual stop.

A further object of the invention is to provide an automatic parking or emergency brake that is powerful or dependable and that applies "Fail-safe", that can be reversed to pull or push on the brakes just as effectively, that can be readily adjusted in order to modulate to the desired brake pressure required to bring any vehicle so equipped to a gradual controlled stop, taking into account the great variation in weight between small motor cars and large school buses and trucks, and that can be quickly disengaged when required to be so for other service and/or in the event the vehicle should require towing.

Yet another object of the invention is to provide therewith a security key and switch, not unlike that found in highly sophisticated burglar alarm systems that can be locked, thereby preventing unauthorized persons from moving the vehicle even after having started the engine.

Still another object of the invention is to provide a seat swich such as that disclosed in my U.S. Pat. No. 3,487,451, and arranged so that in the event that the driver's seat is vacated for any reason, such as while the vehicle is in motion or otherwise, the parking or emergency brake would automatically apply. With safety regulations of the Federal Highway Administration and the Bureau of Motor Carriers in mind, the present invention was devised with the knowledge of what car manufacturers and their suppliers will approve. Therefore, another object of the invention is to provide a novel automatic brake mechanism that will receive acceptance by the motoring public, will be heralded by safety engineers as a necessity, will not be objected to by automobile or brake manufacturers, and will be acceptable by and gain the approval of Federal authorities whose duty it is to approve or disapprove any device of this nature so that the invention can be mass produced at a low cost and thereby become a standard part of all motor vehicles.

It is known that a great many vehicles are being produced, which are sold as standard, having power steering, and the power steering mechanism is powered by a hydraulic pump driven by a V-belt and pulley off the motor, and those vehicles not so equipped with power steering at the factory can readily be fitted with a similar hydraulic pump. The present disclosure utilizes this hydraulic pump as a means to provide an opposing force to cause brake release and utilizes by adjustable spring pressure for brake application when this opposing hydraulic force is either diminished or removed.

In the accompanying drawings, wherein an illustrative embodiment is disclosed,

FIG. 4 is a longitudinal sectional view through a fluid cylinder consisting of a threaded body and a threaded cover which permits adjustment of the spring to exert the exact amount of pressure desired on the brakes and is operable when suitable pressure has been built up within it to hold the brakes in a released condition;

FIG. 5 is a somewhat similar sectional view through the cylinder when it is empty of fluid or when fluid pressure has been reduced to enable a compression spring to become effective to apply the brakes;

FIG. 5a shows the slotted clevis on the shaft of the fluid cylinder;

Figure 1:
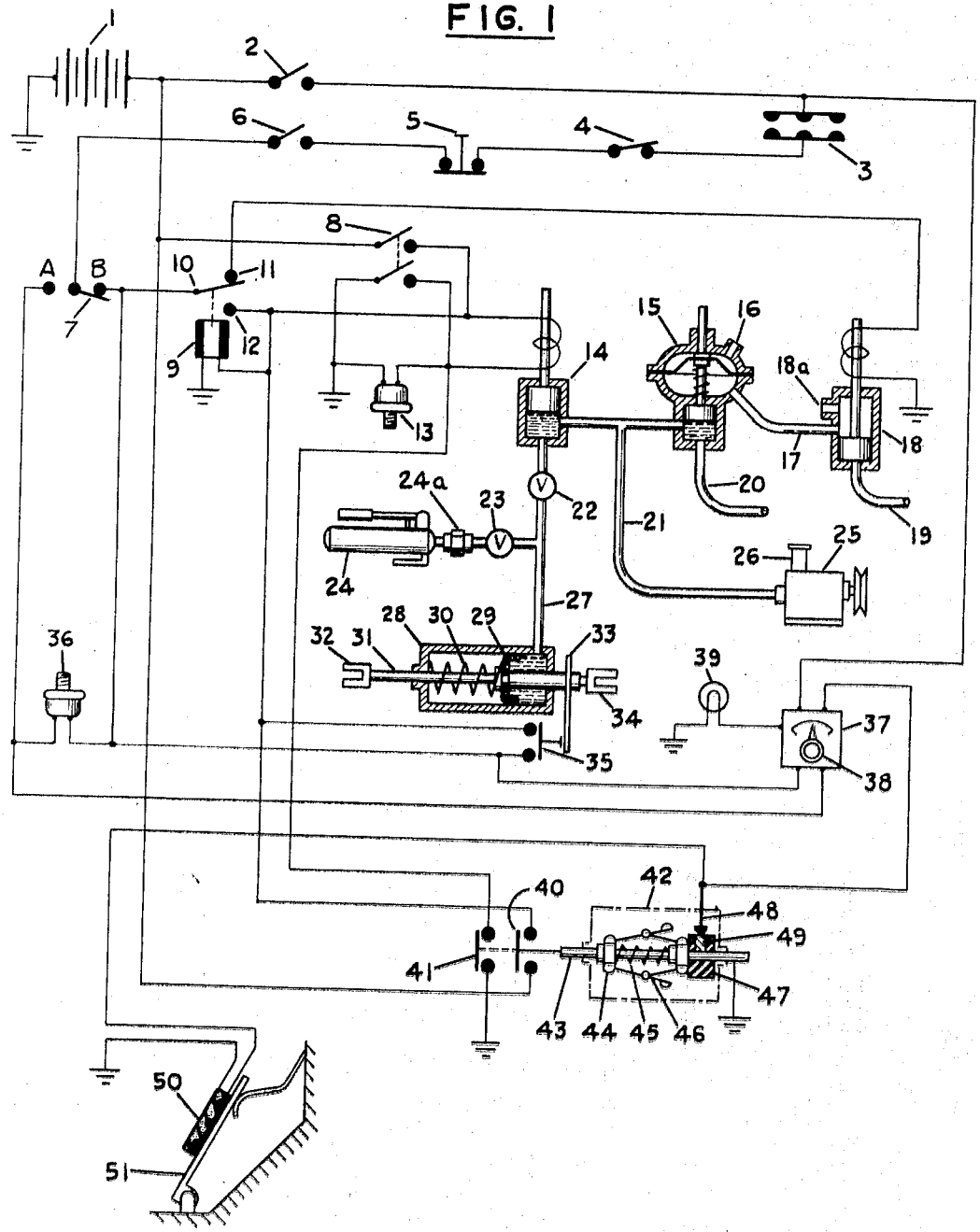
FIG. 1 is a diagrammatic view of an arrangement constructed in accordance with the invention.

In FIG. 1 of the drawing, the various components of the system are more or less diagrammatically shown and it will be understood that they are electrically connected substantially as shown in the drawing.

At 1 is shown the vehicle battery and in the line leading therefrom is the ignition switch 2. A seat which is shown at 3 and at 4 is an emergency braking switch that is placed in close proximity to the driver, such emergency braking switch being normally closed.

A foot brake switch is shown at 5 and is positioned beneath the foot pedal of the service brakes, said switch 5 being normally closed. A security switch is shown at 6 and is one that can be placed side-by-side with the ignition switch 2. At 7 is shown a selector two-way switch. This switch 7, when in the position "A" operates with the delayed action relay creeping control 37, and when in position "B" operates without the creeping control. The accelerator pedal is shown at 51, the same being operative with the multi contact normally open pressure switch 50.

Referring to FIG. 1, in normal operation a vehicle equipped with power steering would include a hydraulic pump such as shown at 25, and would contain a reservoir such as shown at 26. It would have a high pressure line as shown at 21, which would normally connect to the steering box, not shown. There would also be a low pressure return line from the steering box to the hydraulic pump 25 (said low pressure return line not shown).

A brief explanation of how the power steering pump functions: When the steering wheel is turned the flow of fluid is restricted, and the harder the steering wheel is turned, the more the fluid is restricted, and the degree of restriction of the fluid will be the degree the fluid pressure is built up by said pump. For instance, it is not uncommon to obtain a fluid pressure of 1,000 psi or more with sufficient restriction.

A brief explanation of how the automatic parking and emergency brake functions: Spring pressure within the braking unit maintains the brakes applied at all times said spring pressure is not opposed, and in general practice it would not be opposed when the engine is shut off, and would not be sufficiently opposed to interfere with the functions thereof when the engine is running. Therefore, when the engine is started a momentary restrictive valve placed between the hydraulic steering pump and the steering box causes a momentary restriction of the fluid. A high pressure is quickly attained and a small portion of the fluid is directed through the normally open magnetic valve to the cylinder of the brake unit, at which time the aforesaid spring within the brake unit is quickly compressed, causing brake release. The normally open magnetic valve is then energized and closes, locking the aforesaid fluid in the brake unit, maintaining brake release until said valve is deenergized and opened.

The combination of the electrical circuitry and valve arrangement are such that a cycling action results, and when electrical energy is lost brakes apply, and when electrical energy is restored brakes release. In each instance with a lapse of time of less than one second, and with the combination of high pressure fluid and low cavity displacement in the brake unit only a working amount of under 1½ ounces of fluid is required to obtain brake release, resulting in a negligible amount of fluid being displaced from the reservoir of the hydraulic pump.

At 25 is shown a hydraulic steering pump, and when the motor of the vehicle is started said pump 25 will turn. Relay shown at 9 will remain deenergized. Valve 18 which is a solenoid valve and which is normally closed, will open. Solenoid valve 18 controls vacuum to normally open restrictive valve 15. Valve 15 will then close and the flow of fluid from pump 25 will thereupon become restricted. The valve shown at 14 will be open and the high pressure oil or fluid passing through piping 21 will build up in the cylinder 28 acting against the piston 29 therein and forcing said piston and its attached shaft 31 against the compression of the spring 30, toward the left as seen in FIG. 4. Shaft 31 is connected through the clevis 32 to the brake mechanism, and will be operative to maintain a release of the brakes as long as sufficient fluid pressure is maintained in the cylinder 28 to overcome the pressure of the spring 30. In the line between valves 14 and 18 is a normally open vacuum controlled restrictive valve 15.

When the switch shown at 35 is closed by the arm 33 on the shaft 31, the relay 9 will be energized and when this happens several things will occur simultaneously. The valve 14 will close while the valve 18 will open and relay 9 being in a holding circuit will remain closed until energy is lost, and upon energy being lost relay 9 will open, and in turn will open valve 14 and valve 18 will remain open until energy is restored.

Figure 2:
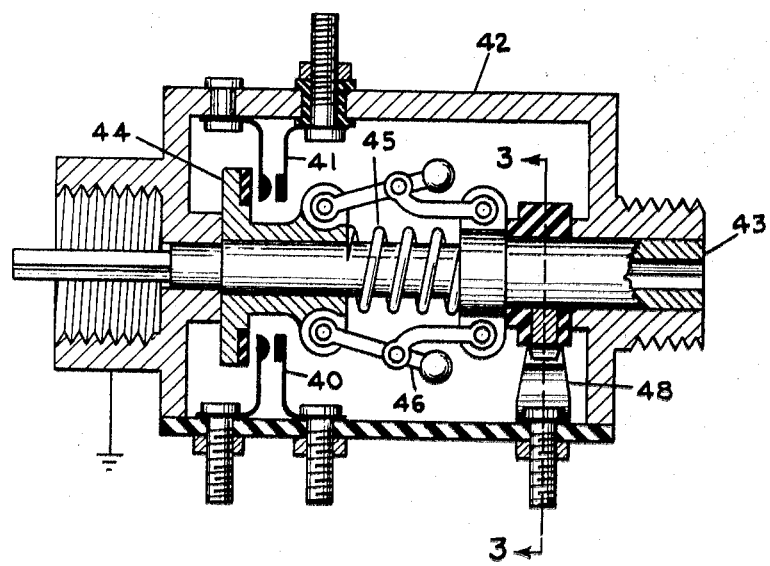
FIG. 2 is a longitudinal section view through a safety governor and an intermittent current conductor. The governor portion of FIG. 2 is for the purpose of preventing, if desired, the emergency brakes from being applied over any given speed, and the intermittent current conductor is for the purpose of activating the delayed action relay when the vehicle is in motion.
Figure 3:
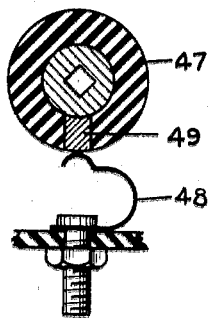
FIG. 3 is a sectional view taken substantially on the line 3—3 of FIG. 2, looking in the direction of the arrows.
Figure 6:
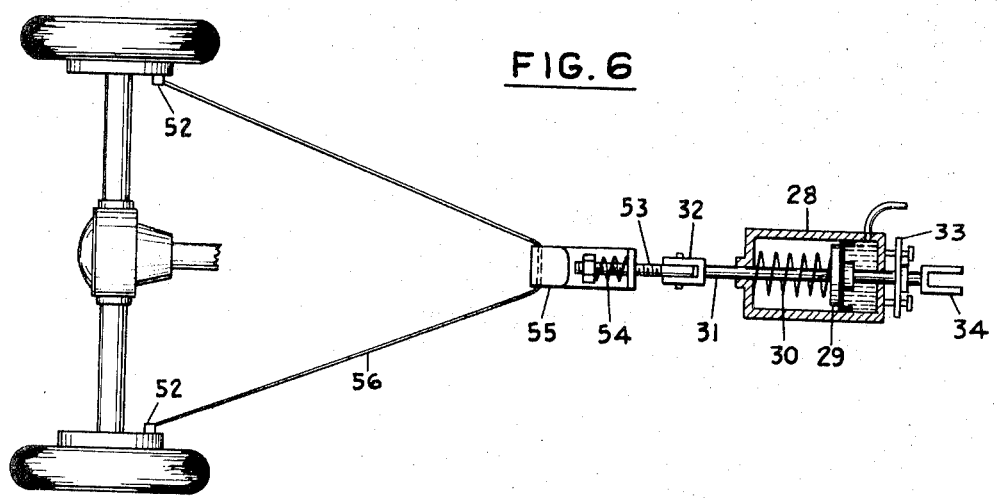
FIG. 6 is a plan view showing how the brakes may be coupled to the applying mechanism; and, FIG. 7 is a similar view showing the coupling to the hand-operated emergency or parking brake lever.
Figure 7:
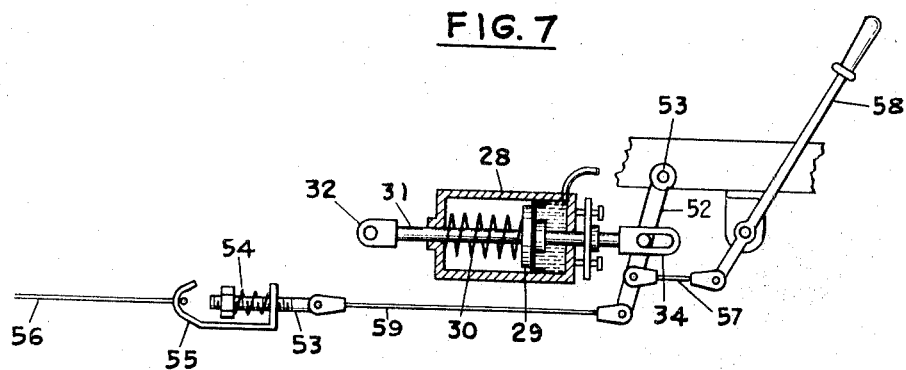

A safety governor is shown in the circuit at 46, the same being disclosed in detail in FIGS. 2 and 3. The governor includes an intermittent current conductor 47. The governor is arranged to prevent the automatic parking and emergency brakes from being applied over any given speed desired, such as someone inadvertently turning off the ignition switch at high speed. The governor 46 is operative on the switching 40—41 by longitudinal sliding movement of the sleeve 44 (FIG. 2) on the shaft 43. Normally, when the governor is not in operation, the switches 40–41 will be open, the sleeve 44 being kept from contact with the switches 40–41 by the pressure of the spring 45. When the governor is operating, the switches 40–41 will be closed, thus keeping the brakes released by preventing the valve 14 from opening. When the valve 14 opens the brakes will be applied since the fluid passing the valve 14 will return from the cylinder 28 into the reservoir 26 of the pump 25.

The switch shown at 13 is a pressure switch connected into the oil line of the motor and arranged so that as long as 1 or 2 psi of pressure are imposed on the fluid, the switch 13 will be closed, energizing the coil of valve 14 which would cause the application of the brakes in the event the motor should stall by breaking the circuit of the coil in valve 14 to ground.

At 36 is shown another pressure switch for location in the hydraulic brake system and operative, for example, like a stop light switch, and is for the purpose of preventing the service brakes and the emergency brakes from ever applying at the same time.

A shut-off valve is shown at 22 and if it is desired to service the vehicle while the engine is in operation and the brakes are released, there will be high pressure in the line between the valve 14 and the brake unit 28. The shut-off valve 22 can be turned, thus locking the hydraulic fluid in the brake unit 28 regardless of what happens such as, for example, the valve 14 being opened.

At 24 is shown a portable pressure pump which can be operated through shut-off valve 23.

The shaft 31 of the brake unit 28 may be provided with one or more transverse holes 31A (FIG. 4) through which a pin can be inserted to thus lock the unit against brake application when desired.

Under normal circumstances the speedometer cable found on all motor vehicles finds connection to the transmission or elsewhere on the running gear and turns at the approximate rate of 1,000 revolutions per mile.

Housing 42 containing governor 46 and intermittent current conductor 47 is designed to be quickly installed between the transmission and the speedometer cable, and each time the speedometer cable turns one revolution, so will the governor and intermittent current conductor.

One end of shaft 43 of the governor unit 42 is connected to the transmission of the vehicle where the speedometer normally connects and the speedometer cable is then connected to the other end of the governor unit 42, and when the vehicle is in motion intermittent current is conducted to ground each time segment 49 contacts brush 48, causing a delayed action in electronic relay 37 and in turn delaying the application of the brakes for approximately 3 seconds after vehicle has come to a complete stop, and so long as intermittent current continues to conduct through segment 49 and brush 48 to ground, such as the vehicle continuing to be in motion, emergency brakes will not apply, but will apply when vehicle comes to a complete stop and-/or after a 3-second delay occurs.

38 is an adjustment on the electronically controlled delayed action relay 37, and is for the purpose of varying the amount of delay desired from 2 to 5 seconds.

39 is an indicator light that is connected to a point of the delayed action relay 37, preferably positioned where the driver can readily observe, and will glow seconds after the vehicle is stopped, notifying the driver when he may proceed to remove his foot from the service brake pedal as when said light glows emergency brakes will apply, preventing the vehicle from creeping.

Referring to the schematic views shown in FIG. 1, it will be noted that the automatic parking and emergency brake unit operates substantially as follows: With the selector switch 7 in the position "B", the ignition switch 2 closed and the seat switch 3 closed, and the foot brake switch 5 closed, the current from the battery 1 will be directed to the center or common terminal of the selector switch 7. Also, with the selector switch in position "B" current will be directed to terminal 10 of the relay 9. The relay 9 will be de-energized and point 10 will be in contact with its top contact 11 and the current directed to the coil of the magnetic vacuum valve 18 which will thus be energized, and when coil of magnetic vacuum valve 18 is energized vent 18a would be closed to atmosphere and vacuum will be directed through piping 19 through valve 18 and thence through piping 17.

The engine is then started. Vacuum from source 19 will enter normally open restrictive valve 15 in the vacuum chamber below the diaphragm in said valve. Atmosphere will also enter vent 16 above the diaphragm of said valve 15. Plunger in said valve will close, causing a momentary restriction and build up high fluid pressure by pump 25 in piping 21. This causes pressure to be exerted against piston 29 in brake unit 28 in opposition to spring 30 to thus move shaft 31 to the left, causing the brakes to release, and when the brakes are fully released the normally open push button switch 35 will be contacted by arm 33 and will close, causing relay 9 to energize. The relay circuit is of the holding type and relay 9 will remain energized until de-energized because of a number of eventualities.

When relay 9 is energized, a number of effects are secured. Point 10 of relay 9 opens contact 11 and closes contact 12, thus de-energizing the magnetic vacuum valve 18 and energizing the normally open magnetic valve 14. The high pressure fluid that was displaced to the brake unit 28 is sealed by the closure of said normally open valve 14 and holds the brake released, and the normally open momentary restrictive valve 15 is restored to its original position, permitting the power steering pump 25 to provide fluid through piping 21 and 20 to the steering box in the normal manner.

The governor-operated switch 40 closes when the vehicle reaches a predetermined speed. This completes an energization circuit for the coil of valve 14 directly from battery 1. At this time, the selector switch 7 may be moved to position "A" to put the coil of valve 14 under the control of the delayed action relay 37 if the vehicle is stopped, as explained hereinafter.

It will be observed that if any one of a number of things took place, the normally open magnetic valve 14, presently closed, will be de-energized, causing the brake application. For example, if the ignition switch 2 was opened or if the driver removed himself from the seat switch 3, or the normally closed emergency switch 4 was opened, or normally closed foot brake switch 5 was opened, or the security switch 6, or any of these switches were open, brake application would occur. Attention is directed to the normally closed foot brake switch 5. This push-botton type switch is preferably positioned under the brake pedal to be contacted therewith if the brake pedal would go to the floor through loss of hydraulic fluid, blown seal, rupture of hydraulic line or air entering the hydraulic system. In any such event the normally closed foot brake switch 5 would be contacted and as a result the normally open magnetic valve 14 will be de-energized, causing the fluid to leave the brake unit 28 and be directed back to the steering pump 25. The emergency brake would then become applied by pressure of spring 30.

If any of the open switches are again closed, the brakes would immediately release. For example, if a driver was proceeding on icy roads and the service brake was pressed and found to be inoperative, the normally closed foot brake switch 5 would be contacted and would cause application of the brakes. Let us say this unfortunate emergency situation should occur on icy or slippery roads and with brake application the rear wheels began to skid, in such cases the vehicle is inclined to turn sideways. An experienced driver would naturally release the service brakes, permitting the vehicle to straighten up. Likewise, an experienced driver would be able to release the emergency brake just as readily because the moment foot pressure is released somewhat from the service brake pedal, brake switch 5 will close releasing the brakes, so that with a number of brake applications and releases, even on wet, slippery or icy roads, the vehicle could be brought to a safe, gradual stop.

With respect to the normally open engine oil pressure switch 13, it is to be stated that this switch can either be used or by-passed. It is primarily for the purpose of causing brake application in the event that the motor stalls, if this feature of the device is desired.

The normally open service switch shown at 8 causes valve 14 to energize and with the engine running and brakes released valve 14 can be energized for any given length of time while the vehile is being serviced, washed or otherwise worked on, or for any other desired reason.

The normally open service switch shown at 8 is either placed under the hood or in the glove compartment, or in a location not easily accessible, and can be closed to continuously energize valve 14 when the engine is running and the brakes released, and will have the effect of locking the fluid in brake unit 28 for any length of time and is desirable when the vehicle is being serviced, washed or otherwise worked on. It will be noted that the aforesaid service switch 8 and governor control switches 40 and 41 are connected in common to not only energize the coil continuously of valve 14, but to by-pass all other switches, including by-passing oil pressure switch 13 to ground.

The portable pressure pump shown at 24 is for the purpose of deactivating the system if required when either the motor or power steering pump malfunctions. If, for example, the vehicle becomes stranded because of the motor becoming inoperative, or the belt of the pump breaks, or for other reasons, the shut-off valve 22 can be closed. Portable pressure pump 24 can be connected at coupling 24a, shut-off valve 23 can be opened, and 1½ ounces or so of hydraulic fluid can be manually pumped from portable pressure pump 24 through piping 27 into brake unit 28 and release the brakes, and when the brakes are fully released shut-off valve 23 can be closed, retaining the brakes in a released condition. When malfunction has been corrected portable pressure pump 24 can again be connected at coupling 24a, shut off valve 23 can be opened, and the displaced fluid from hydraulic pump 24 into brake unit 28 will be returned to hydraulic portable pump 24, and at the conclusion shut-off valve 23 can be again closed and shut-off valve 22 can be opened, and portable pump 24 can be removed at coupling 24a, and the system will be restored to perform its normal function.

It is also possible to release the brakes by relieving the pressure of spring 30 by unscrewing the threaded closure cap 28a on cylinder 28 (FIG. 4).

Still another method of retaining the brakes in a released condition while the motor is running and magnetic valve 14 closed would be to turn shut-off valve 22 to its "off" position, then regardless of energy being lost on valve 14 high pressure fluid will be retained in piping 27 and in cylinder 28.

The delayed activating relay shown at 37 and the intermittent current conductor 47 in housing 42 are for the purpose of applying the brakes by de-energizing the normally open magnetic valve 14 approximately 3 seconds after vehicle has come to a complete stop to prevent the vehicle from creeping. This action can take place only if selector swich 7 is in position "A". Unit 42 will connect where the speedometer cable is normally attached at the transmission, and the speedometer cable is then attached to the unit 42. That is to say, the speedometer cable is first disconnected at the transmission. Unit 42 is then connected to the transmission and speedometer cable is then connected to unit 42. Therefore, when the vehicle moves, or is in motion, the speedometer cable revolves as before. The transmission revolves unit or the enclosure of unit 42, and the enclosure of unit 42 revolves the speedometer cable.

The intermittent current conductor 47 consists of a segment of metal 49 grounded surrounded by insulation material 47, and each time shaft 43 revolves segment 49 comes in contact with brush 48 and pulses delayed activation relay 37, causing a delay of approximately 3 seconds more or less as determined by adjusting screw 38 on delayed activating relay 37. In practice both the segment 49 and brush 48 are kept narrow in order to accomplish a great number of stops mathematically without stopping with the segment contacting the brush. Nevertheless, when this occurs indicator light 39 will not glow, and with the removal of the foot from the service brake pedal, the vehicle will merely creep ahead some few inches, and at that point will be prevented from further movement as brakes will apply.

It will be noted that with a 3 seconds delay in the activating relay the brakes will not apply with the vehicle creeping at approximately 1 mile per hour, and will only apply when the vehicle is put in neutral and permitted to coast to a complete stop, or when it has been stopped in the usual way with the application of the service brakes.

Governor 46 is also enclosed in housing 42 and revolves with shaft 43, and is for the purpose of providing a safety measure, if required, to assure the parking and emergency brakes would not apply over any given speed required, determined by adjustment of spring 45 contained in said governor 46.

The switch shown at 50 is a normally open multi contact pressure switch, consisting of 2 metal plates with a section of foam rubber sandwiched between said plates. One of said plates contains a plurality of sharp metal points that are pierced through the said section of foam rubber and all contained within an envelope of insulating material, and is for the purpose of assuring that momentary contact is made regardless of where on the surface of the switch the driver might place his foot. The switch itself, including the envelope, is connected to accelerator pedal 51 by adhesive, or other means.

It will be noted that when normally open pressure switch 50 is momentarily contacted, delayed action relay 37 will be activated for the number of seconds as determined by adjustment 38, that is to say, with sensible driving the automatic parking and emergency brake is fully released before the vehicle moves, and the aforesaid delay when pressure switch 50 is momentarily contacted will prevent the brakes from re-applying in the event the throttle is quickly released before segment 49 passes once under the brush 48.

In proceeding, the driver gets on the seat and turns on the security switch 6 and ignition switch 2, and with the selector switch 7 in position "B", starts the motor of the vehicle. The parking brake is immediately released within one second. The driver drives away and once the governor-operated switch 40 has closed the coil of valve 14 will be energized through that switch to maintain the parking or emergency brakes released. After switch 40 has closed, the driver should move the selector switch 7 to position "A" if he wants to put the parking or emergency brakes under the automatic control of the delayed action relay 37 (once the vehicle has slowed down to where switch 40 will open). At the end of his journey he shuts off his ignition and the parking brake is applied automatically as follows:

The energization circuit for the portion of relay 37 that is connected across its two upper terminals in FIG. 1 is opencircuited at the intermittent current conductor 47 and at the accelerator pedal switch 50. After a time delay of 3 seconds or so, this causes the path through the two lower terminals of relay 37 to be open-circuited there. This breaks the energization circuit for the coil of valve 14, which then opens and relieves the fluid pressure in cylinder 28, and spring 30 moves the piston 29 to the right to apply the parking or emergency brakes. With the selector switch 7 in position "A" and the driver occupying the seat as before, he starts the engine and the parking brake will release only when his foot momentarily closes pressure switch 50 on the throttle 51, and the brakes will continue to remain in a released condition for 3 seconds after he has removed his foot from pressure switch 50 and permitted said pressure switch 50 to open. This allows sufficient time for the vehicle to move and the delayed activating relay 37 to come into effect. The coil of valve 18 is energized through selector switch 7 (in position "A") through the delayed action relay 37 and relay contacts 10, 11 to initiate the action of pressurizing the cylinder 28 as already described. Each time that the vehicle is stopped and remains stopped for 3 seconds and the driver removes his foot from the service brake, the emergency brake will apply, and then when he presses the throttle the emergency brake will release and will remain released with the vehicle in motion until he either shuts off the engine or stops again for a 3-second period of time. However, regardless of whether selector switch 7 is in position "B" or "A" in the event of any emergency, all of the functions of the parts as herein described will apply.

Valve 15 was designed to operate successfully under high temperature conditions, such as that generated by hydraulic pump 25 and related components. The aforesaid high temperature would have an adverse effect upon the coil of a solenoid valve and would increase the resistence beyond what could be tolerated, whereas electric solenoid valve 14 can be placed at a distance, valve 15 could not. It is foreseen that electronic means could be substituted for governor 46 in housing 42, and portable pump 24 could become a part of the general system. Valves 14 and 15 could be combined and both vacuum controlled, and housing 42 rahter than connect to the transmission could readily be inserted or connected between the speedometer cable, that is to say, a short cable could extend from each end of unit 42, and 42 could become standard for all vehicles.

In the illustrated embodiment of this system, the relay coil 9 has three distinct energization circuits, and if any of these circuits is completed, the parking or emergency brakes will be held released:

1. when selector switch 7 is in position "B", through switches 2 – 6 and brake switch 35;
2. when selector switch 7 is in position "A", through switches 2 – 6, the lower terminals of delayed action relay 37, and brake switch 35; and
3. in either position of selector switch 7, directly from the battery 1 through the governor-controlled switch 40.

From the foregoing it will be apparent that novel means has been disclosed to effectively and automatically restrain any size motor vehicle from movement when parked and to automatically prevent vehicles from movement when stopped while the motor is in operation. And novel means has been disclosed to automatically release the brakes.

It will also be apparent an automatic back-up or emergency means has been disclosed to bring a vehicle to a safe stop in the event of a service brake failure. The system is thus fail-safe throughout and novel means are provided to meet any contingency that may arise, such as a rash or inadvertent act by the driver, a malfunction or breakdown of associated and/or related equipment without adding to the work load of the steering pump or affecting the normal operation of the power steering. The units employed are durable and have proven most practical and adequate in actual vehicle use. It is understood that the invention is not limited to the precise construction shown, but that changes are contemplated that readily fall within the spirit of the invention as shall be determined by the scope of the subjoined claims.

What I claim is:

1. In a motor vehicle brake system, the combination of:
    an electrical relay operable after a time delay following its de-energization to cause a brake on the vehicle to be applied, and operable when energized to cause said brake to be released;
    an energization circuit for said relay;
    a switch in said energization circuit operable to open and remain open and thereby de-energize said relay when the vehicle stops;
    and a switch operable by the accelerator pedal of the vehicle to open when said pedal is released and to close when said pedal is depressed, said accelerator pedal switch being connected in said energization circuit in parallel with said first-mentioned switch to energize said relay when the accelerator pedal is depressed, even if said first-mentioned switch is open.

2. A brake system according to claim 1 on a vehicle having a battery and an engine ignition switch, wherein said relay has a pair of energization terminals connected in said energization circuit, one of said terminals being connected through the vehicle engine ignition switch to the ungrounded terminal of the vehicle battery, and said accelerator pedal switch and said switch that opens when the vehicle stops being connected in parallel with each other between the other of said energization terminals of the relay and ground.

* * * * *